United States Patent [19]

Yamamoto

[11] 4,327,883
[45] May 4, 1982

[54] LOCK RELEASING DEVICE OF A RETRACTOR PROVIDED WITH AN EMERGENCY LOCKING MECHANISM

[75] Inventor: Kazuo Yamamoto, Sagamihara, Japan
[73] Assignee: NSK-Warner K.K., Tokyo, Japan
[21] Appl. No.: 169,380
[22] Filed: Jul. 16, 1980

[30] Foreign Application Priority Data

Aug. 21, 1979 [JP] Japan .......................... 54/114022[U]

[51] Int. Cl.³ .................. A62B 35/02; B65H 75/48
[52] U.S. Cl. ............................................... 242/107.4 A
[58] Field of Search ................. 242/107.4 R–107.4 E; 280/801–808; 297/475–480

[56] References Cited

U.S. PATENT DOCUMENTS 3,848,888 11/1974 Kazaoka et al. .
4,083,581 4/1978 Clifford .
4,234,209 11/1980 Ikesue ...................... 242/107.4 A X Primary Examiner—John M. Jillions
Attorney, Agent, or Firm—Shapiro and Shapiro

[57] ABSTRACT

In a retractor provided with an emergency locking mechanism comprising webbing take-up means having a main gear and an auxiliary gear, inertia sensing means, and locking means having an auxiliary locking member and a main locking member, a lock releasing device is provided comprising a pivotable cam mechanism designed to cause the main locking member to move into a position in which it is in non-engagement with the main gear and to cause the auxiliary locking member to move into a position in which it is unengageable with the auxiliary gear.

5 Claims, 6 Drawing Figures

LOCK RELEASING DEVICE OF A RETRACTOR PROVIDED WITH AN EMERGENCY LOCKING MECHANISM

BACKGROUND OF THE INVENTION

1. Field of the Invention

This invention relates to a lock releasing device for a seat belt retractor provided with an emergency locking mechanism.

2. Description of the Prior Art

Emergency locking mechanisms have been adopted in many automotive vehicles whereby the retractor restrains the seat occupant only during emergency. However, it is often dangerous if the lock is not quickly released after the retractor has once been emergency-locked.

SUMMARY OF THE INVENTION

It is the object of the present invention to provide, in a retractor provided with an emergency locking mechanism, a lock releasing device which can quickly release the lock after the retractor has been emergency-locked.

The invention will become fully apparent from the following detailed description of a preferred embodiment thereof taken in conjunction with the accompanying drawings.

DESCRIPTION OF THE PREFERRED EMBODIMENT

Figure 1:
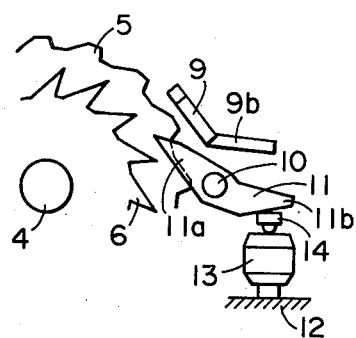
FIG. 1 is a view illustrating the operation of the emergency locking mechanism according to an embodiment of the present invention.

The base 1 of a retractor is formed with side plates 2 and 3 parallel to each other, and a take-up shaft 4 for taking up webbing (not shown) is rotatably provided on the side plates and is biased into take-up direction by a take-up spring, now shown. A main ratchet gear 5 and an auxiliary ratchet gear 6 are secured to the take-up shaft 4. The side plates 2 and 3 are formed with opposed sector holes 8, in which a main locking member 9 is pivotably located. The main locking member 9 is normally biased to a pivoted position spaced apart from the main ratchet gear 5 by a spring, not shown, but during emergency, the main locking member 9 is pivoted in the sector holes 8 against the bias of the spring to engage the main ratchet gear 5 and prevent rotation of the take-up shaft 4 in the webbing drawing or pay-out direction. A bar member 10 parallel to the main lock member 9 and the take-up shaft 4 is movably mounted between the side plates 2 and 3. A ratchet lever 11 is mounted on the bar member 10 for rotation thereon but against axial movement relative to the bar. The ratchet lever 11 has a pawl 11a which is engageable with the auxiliary ratchet gear 6. An inertia member 13 for sensing a predetermined change in the body speed of the automotive vehicle is placed within a case 12 secured to the base 1. When a predetermined speed change occurs, the inertia member 13 is tilted in the case to cause a lever 14 provided in the upper portion of the case to raise the rear portion 11b of the ratchet lever 11 which is in contact with the lever 14. Therefore, the ratchet lever 11 rotates about the bar member 10 to bring the pawl 11a into engagement with the auxiliary ratchet gear 6. At this time, the seat belt wearer leans forward from his own inertia due to a sudden speed change of the vehicle body and thus, the webbing is payed out and the take-up shaft 4 and the auxiliary ratchet gear 6 integral therewith are suddenly rotated in the pay-out direction. Accordingly, the ratchet lever 11 is further rotated and the rear portion 11b thereof raises the rearward projected portion 9b of the main locking member 9 to rotate the main locking member 9 into engagement with the main ratchet gear 5, thus preventing rotation of the take-up shaft 4 in the webbing pay-out direction.

Figure 3:
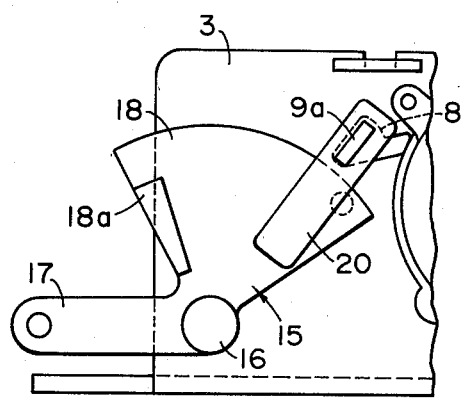
FIG. 3 is a side view showing portions of the mechanism.
Figure 4:
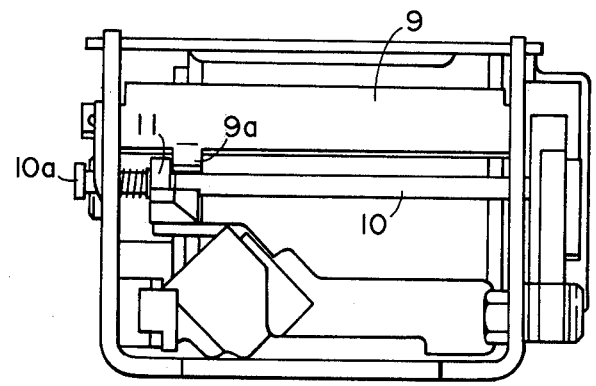
FIG. 4 is a view corresponding to FIG. 2 but showing the position after the lock has been released.
Figure 5:
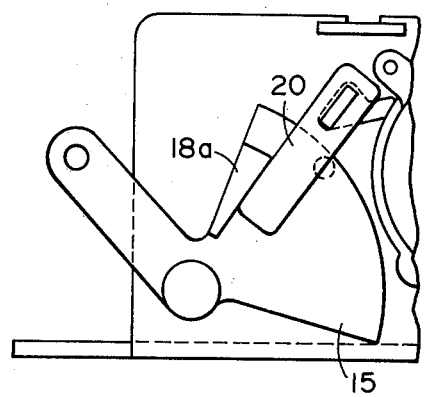
FIG. 5 is a view corresponding to FIG. 3 but showing position after the lock has been released.
Figure 6:
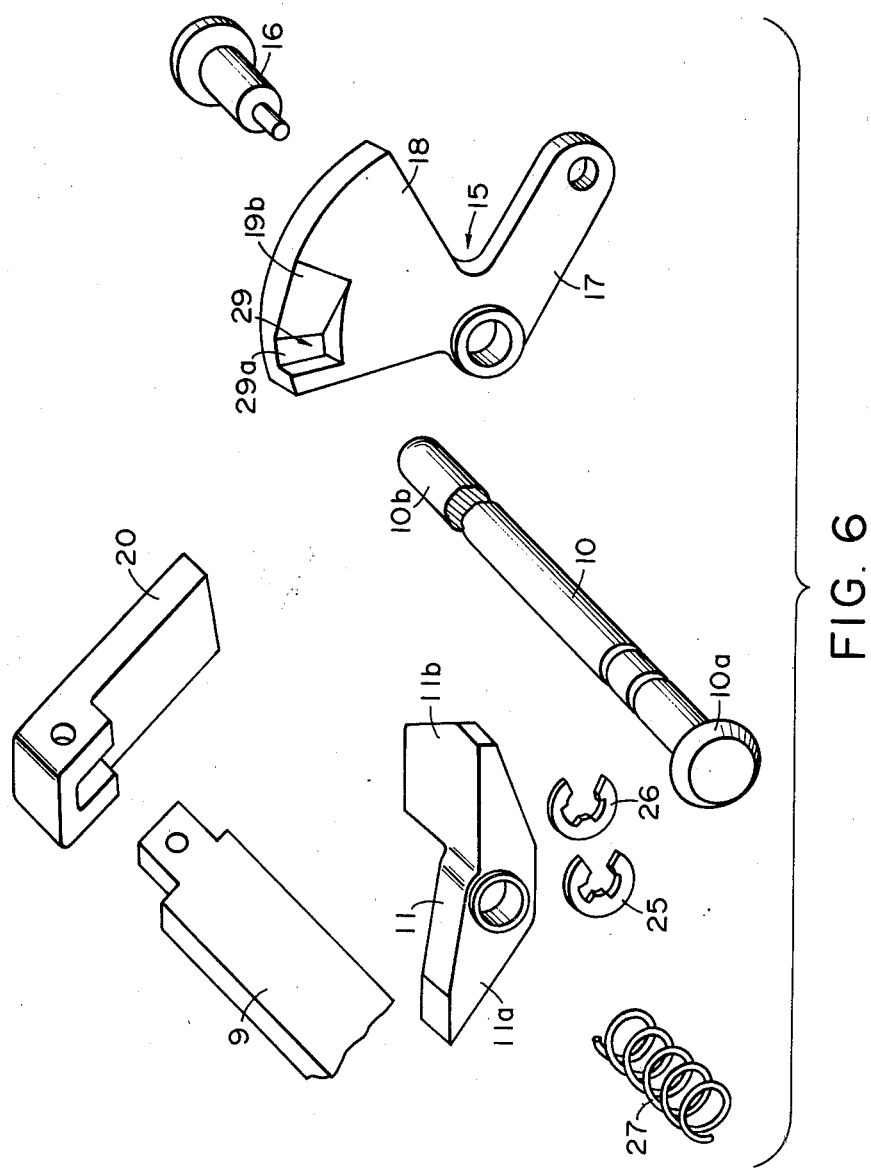
FIG. 6 is an exploded view of the portions of the mechanism.

The movement of the above-described mechanism is known per se. According to the present invention, a pivotable cam member 15 is provided on the side plate 3 for pivotal movement about a shaft 16. The pivotable cam member 15 has an operating lever portion 17 and a sector cam portion 18 formed integrally with each other. The outer side surface of the sector cam portion 18 is planar and one end portion thereof forms a projected portion 18a. On the other hand, a lever 20 is secured to the extension 9a of the main locking member 9, and this lever 20 is projected into the path of pivotal movement of the projected portion 18a of the sector cam portion 18 so that, when the lever 20 strikes against the projected portion 18a, it is pushed thereby to pivot the main locking member 9 out of engagement with the main ratchet gear 5. Accordingly, by emergency locking action, the main locking member 9 is engaged with the main ratchet gear 5 to lock the rotation of the take-up shaft, whereafter the pivotable cam member 15 can be pivoted clockwisely as viewed in FIG. 3, thereby releasing the lock in the manner previously described.

Prior to release of the lock, when the ratchet lever 11 is engaged by the auxiliary ratchet gear 6 and the rear portion 11b thereof is in its raised position, it strikes against the projected portion 9b of the main locking member which returns upon release. Usually, the ratchet lever 11 is made of synthetic resin while the main locking member 9 is made of a metal and therefore, if the pivotable cam member 15 is forced to pivot while portions 9b and 11b are in engagement, there will be a danger of damaging the ratchet lever 11. Therefore, in the present invention, the design is such that with the pivotal movement of the pivotable cam member 15, the ratchet lever 11 is also retracted to a position in which it is not engageable with the main locking member 9.

Figure 2:
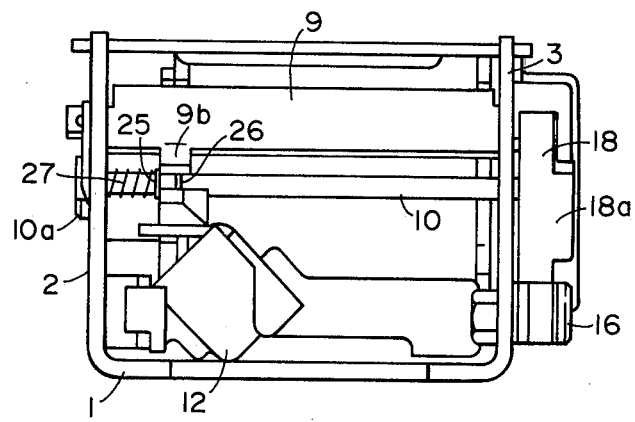
FIG. 2 is a bottom plan view of the locking mechanism.

As a structure for achieving this, the bar member 10 supporting the ratchet lever 11 is supported by the side plates 2 and 3 for movement axially of the take-up shaft 4. A compression coil spring 27 is provided around the bar member 10 between a snap ring 25 holding the ratchet lever 11 on the bar member 10 against sliding movement and the retractor base side plate 2, and the bar member 10 is normally in the position shown in FIG. 2 wherein the ratchet lever 11 is aligned axially with the auxiliary ratchet gear 6. To hold such position, a head 10a is formed at the left end of the bar member 10 as viewed in FIG. 2. The bar member 10 also extends beyond the side plate 3 and such extension 10b thereof (the right end in FIG. 2) is engaged with the groove surface of a cam groove 29 formed in the inner side surface of the sector cam portion 18 of the pivotable cam member 15. The cam groove 29 has a bottom surface 29a engaged by the bar member 10 in the normal position of FIGS. 2 and 3, and an inclined cam surface 19b engaged by the bar member 10 when the pivotable cam member 15 is pivoted from the position of FIG. 3. Accordingly, when the pivotable cam member 15 is pivoted from the position of FIG. 3 to release the lock, the main locking member 9 is pivoted to non-locking position and at the same time, the bar member 10 is moved leftwardly as viewed in FIG. 2 by being pushed by the inclined surface 19b, so that the ratchet lever 11 is retracted out of engagement with the main locking member and away from the position in which it is aligned axially with the auxiliary gear.

During this operation, the operating lever portion of the pivotable cam member 15 may be manually moved, but it is also possible to connect a wire or the like to the operating lever portion so that such portion can be remote-operated or operated by a motor or the like.

According to the present invention, the lock can be easily released after the retractor has been emergency-locked.

I claim:

1. A seat belt retractor provided with an emergency locking mechanism, the retractor comprising webbing take-up means including a main gear and an auxiliary gear, inertia sensing means adapted to change position responsive to a vehicle speed change of predetermined value, an auxiliary locking member adapted to cooperate with said auxiliary gear, means mounting said auxiliary locking member for movement axially with respect to the auxiliary gear, the auxiliary locking member having an axial position in which it is aligned with said auxiliary gear, the auxiliary locking member when in said axial position having a first position in which it is non-engageable with said auxiliary gear, the auxiliary locking member being movable from the first position responsive to a change in position of the inertia sensing member to a second position in which it is engageable with the auxiliary gear and being movable by the auxiliary gear from the second position to a third position responsive to rotation of the auxiliary gear in a webbing pay-out direction, a main locking member adapted to cooperate with the main gear, the main locking member normally assuming a non-engaging position with respect to the main gear and being movable to an engaging position with respect to the main gear responsive to movement of the auxiliary locking member from the second position to the third position, for locking the take-up means against movement in the webbing pay-out direction, and release means for unlocking the take-up means, the release means comprising a first cam member for moving the main locking member from the engaging position to the non-engaging position, a second cam member for moving the auxiliary locking member axially away from said axial position and means for operating the first and second cam members in unison.

2. A seat belt retractor as defined in claim 1, wherein the main locking member includes a projecting portion adapted to be engaged by the auxiliary locking member for moving the main locking member from the nonengaging position to the engaging position and wherein the auxiliary locking member is moved out of alignment with said projecting portion when moved by the second cam member away from said axial position.

3. A seat belt retractor as defined in claim 1 or claim 2, wherein the release means comprises a pivotal member having a cam portion provided with said cam members and a lever portion defining said means for operating the first and second cam members.

4. A seat belt retractor as defined in claim 3 including a lever connected to the main locking member, the first cam member being adapted to cooperate with the lever for moving the main locking member from the engaging position.

5. A seat belt retractor as defined in claim 2, wherein the auxiliary locking member is carried on an elongate bar member having an axis parallel to the pivot axis of the pivotal member, the auxiliary locking member being adapted to pivot about the axis of the bar member between said first, second and third positions, and wherein the second cam member is adapted to move the bar member axially for moving the auxiliary locking member from said axial position.

* * * * *